United States Patent [19]

Asakura et al.

[11] Patent Number: 4,486,578

[45] Date of Patent: Dec. 4, 1984

[54] STABILIZED POLYPHENYLENE SULFIDE AND METHOD FOR PRODUCING SAME

[75] Inventors: Toshiyuki Asakura; Hiroaki Kobayashi, both of Ohtsu; Yukio Noguchi, Shiga, all of Japan

[73] Assignee: Toray Industries Inc., Tokyo, Japan

[21] Appl. No.: 509,880

[22] Filed: Jul. 1, 1983

Related U.S. Application Data

[63] Continuation of Ser. No. 321,695, Nov. 16, 1981, abandoned.

[30] Foreign Application Priority Data

Nov. 27, 1980 [JP] Japan ................. 55-165896

[51] Int. Cl.$^3$ ............................................. C08F 283/00
[52] U.S. Cl. ...................................... 525/535; 528/388
[58] Field of Search ......................... 525/535; 528/388

[56] References Cited

U.S. PATENT DOCUMENTS

| | | | |
|---|---|---|---|
| 3,354,129 | 11/1967 | Edmonds, Jr. et al. | 528/388 |
| 3,919,177 | 11/1975 | Campbell | 260/179 |
| 4,025,496 | 5/1977 | Anderson et al. | 528/388 |
| 4,125,525 | 11/1978 | Campbell | 528/388 |
| 4,282,347 | 8/1981 | Tieszen et al. | 528/388 |
| 4,286,018 | 8/1981 | Asakura et al. | 528/388 |
| 4,301,274 | 11/1981 | Campbell | 528/388 |

*Primary Examiner*—Melvyn I. Marquis
*Attorney, Agent, or Firm*—Austin R. Miller

[57] ABSTRACT

A stabilized polyphenylene sulfide is provided which comprises a recurring unit

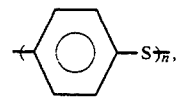

wherein the average n between foreign units is greater than about 5, and about 0.05 to 10 mole % per phenylene sulfide unit of an aromatic constituent chemically bonded with said polyphenylene sulfide chain, said aromatic constituent containing an electron attractive group selected from the group consisting of —SO$_2$—, —CO—, —NO$_2$, —SO$_3$R, —COOR, wherein R is H, lower aliphatic hydrocarbon groups, aromatic hydrocarbon groups or alkaline metals, and —CONH—, and said stabilized polyphenylene sulfide has a melting point in the range of about 250° C. to about 350° C. Also provided is a method for preparing stabilized polyphenylene sulfide comprising preparing a polyphenylene sulfide consisting mainly of a recurring unit

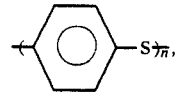

wherein the degree of polymerization of said recurring unit is greater than about 20, and reacting said polyphenylene sulfide with about 0.05 to about 20 mole % per said phenylene sulfide unit of a halogenated aromatic compound having an electron attractive group.

9 Claims, No Drawings

STABILIZED POLYPHENYLENE SULFIDE AND METHOD FOR PRODUCING SAME

This application is a continuation of application Ser. No. 321,695, filed 11/16/81 now abandoned.

The present invention relates to a stabilized polyphenylene sulfide which has superior resistance to oxidation and weathering, good melt stability, and low corrosive gas emission, and also relates to a method of preparing same.

In recent years polyphenylene sulfide has been widely employed in the fields of coating and injection molding, wherein it has been a general practice to cure the polymers in air to increase crosslinking or branching of the polymer chain. The use of polyphenylene sulfides, particularly those having linearly high molecular weights, is expected to be further expanded into such end use applications as films, yarns, shaped articles, molded items, etc. In such applications of the high molecular weight polymers, it is important that the films, yarns and other products produced be resistant to oxidation, resistant to weathering or ultraviolet radiation and have low emission of corrosive gases. It is also of vital importance that the polymer possess good viscosity stability during melt spinning, molding, and other production operations used in producing the films, yarns, and shaped particles or molded items. Polyphenylene sulfides presently known in the art, however, do not possess these desired properties and therefore, may not be advantageously utilized in many end use applications.

Accordingly, an essential object of the present invention is to provide a stabilized polyphenylene sulfide which has good melt stability, weatherability, resistance to oxidation and low corrosive gas emission, with substantial elimination of the disadvantages inherent in the conventional polyphenylene sulfides.

Another important object of the present invention is to provide a method of manufacturing a stabilized polyphenylene sulfide of the above-described type.

To accomplish these and other objects, according to the preferred embodiments of the present invention, there are provided a stabilized polyphenylene sulfide and a method of producing same.

The stabilized polyphenylene sulfide of the present invention comprises a recurring unit,

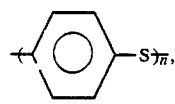

wherein the total n is greater than 20 and the average n between foreign units is greater than 5, and 0.05 to 10 mole % per phenylene sulfide unit of an aromatic constituent chemically bonded with said phenylene sulfide chain, said aromatic constituent containing an electron attractive group selected from the group consisting of —SO$_2$—, —CO—, —NO$_2$, —SO$_3$R, —COOR, wherein R represents H, low aliphatic hydrocarbon groups, aromatic hydrocarbon groups or alkaline metals, and —CONH—, and wherein said stabilized polyphenylene sulfide has a melting point in the range of 250° C. to 350° C.

The method of preparing the stabilized polyphenylene sulfide of the present invention comprises preparing a polyphenylene sulfide mainly consisting of a repeating unit represented by the formula

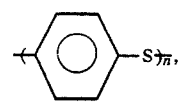

wherein the degree of polymerization of said recurring unit is greater than 20, and thereafter reacting said polyphenylene sulfide with 0.05–20 mole % (per polyphenylene sulfide unit) of a halogenated aromatic compound having an electron attractive substituent.

The polyphenylene sulfide of the present invention is mainly composed of a constituent unit represented by the formula

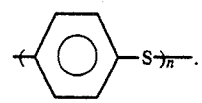

This main constituent,

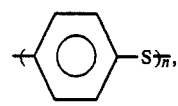

comprises at least about 90 mole %, and preferably, at least about 95 mole %, and the remaining constituent units may be units which are capable of random copolymerization, for example

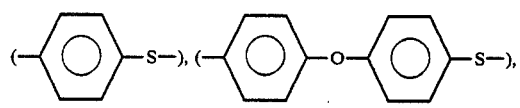

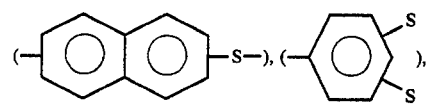

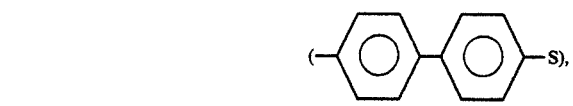

etc. The average chain length of the main constituent unit is required to be at least about 20, i.e. where the polymer is represented by the formula

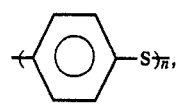

and n is greater than about 20. Values less than 20 are not preferred, since the features inherent in polyphenylene sulfide, such as high crystallinity characteristics, high heat resistance characteristics, etc. cannot be fully developed at lower molecular weights.

The stabilized polyphenylene sulfide of the present invention further contains about 0.05 to 10 mole %, and preferably 0.05 to 2 mole % of an aromatic constituent containing an electron attractive substituent. This aromatic constituent denotes univalent to quadravalent groups having an electron attractive functional group bonded with phenyl, naphthyl, etc., where the electron attractivity is based on the non-substituted phenyl group. Hammett's σ value, frequently used in the substitution reaction of the aromatic ring, may serve as a measure of the electron attractivity. For the electron attractive substituent as described above, those represented by —SO$_2$, —CO—, —NO$_2$, —CN, —SO$_3$R, wherein R represents H, low aliphatic hydrocarbon groups, aromatic hydrocarbon groups or alkaline metals, and —CONH—, are preferable, and halogens, especially chlorine, may be utilized as the electron attractive group.

Examples of the aromatic constituents having the electron attractive substituents and contained in the stabilized polyphenylene sulfide of the present invention include:

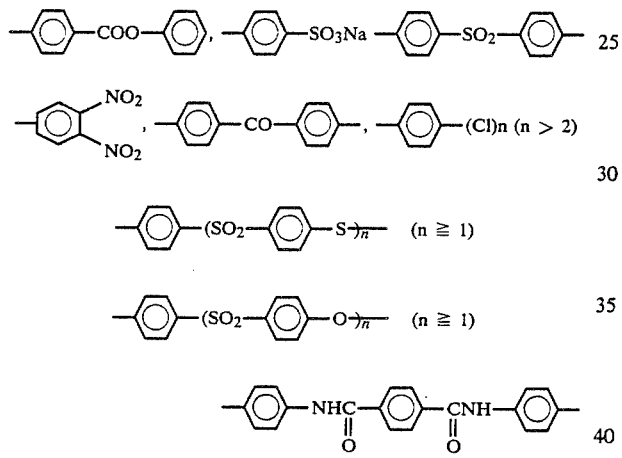

In the stabilized polyphenylene sulfide of the present invention, the aromatic constituents having the electron attractive substituents must be present in the chain ends or branched chains or in the main chain, and the stabilizing effect on the polymer may be produced by the mixing of other polymers containing these constituents. The aromatic constituent having the electron attractive substituents should preferably be present in the range of 0.05–2 mole %. If this constituent is present in quantities less than the above range, the stabilizing effect is reduced, while if the content is excessive, particularly exceeding 10%, the melting point, glass transition temperature and other properties are changed, thereby undesirably effecting the properties inherent in conventional polyphenylene sulfide, although the stabilizing effect may still be produced. For example, in polyphenylene sulfide having the formula

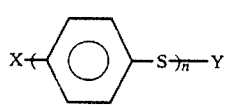

where n equals 200 and

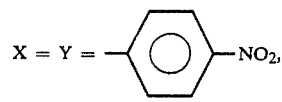

the aromatic constituent having the electron attractive substituent in the polymer is 1 mole %.

The stabilized polyphenylene sulfide of the present invention preferably has a melting point in the range of about 250° C. to 350° C. and a viscosity greater than about 100 poise measured at a temperature of 300° C. and a shear rate of 200 sec$^{-1}$.

The method of preparing the stabilized polyphenylene sulfide, according to the present invention, will be described hereinbelow.

The polyphenylene sulfide of the present invention is prepared by reacting dichlorobenzene with sodium sulfide in a polar solvent to cause the chain length, represented by the formula

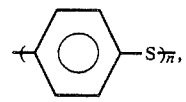

to be greater than 20 and then further introducing the aromatic compound containing the electron attractive substituent. The aromatic compound containing the electron attractive substituent may be reacted with the untreated polyphenylene sulfide during polymerization or after the completion of polymerization.

The aromatic compound to be used in this invention should be one containing an electron attractive substituent and a halogen substituent, represented by the formula

in which X is Cl or Br, and n=1 to 4, and Y is a substituent containing at least one electron attractive group selected from the groups consisting of —SO$_2$—, —CO—, —NO$_2$, —CN, —SO$_3$R, —COOR, wherein R represents alkaline metals, H, C$_1$ to C$_8$, alkyl or phenyl and substituted phenyl groups thereof, and —CONH—, and m=1 to 3. In such aromatic compounds, the halogen is more activated than dichlorobenzene so that it may be readily subjected to the substitution reaction. Therefore, it is more effective to employ a process in which the aromatic compound containing the electron attractive substituent is reacted at a later stage of polymerization, or after making the chain length such that in the chain represented by

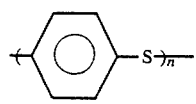

is greater than 20 through isolation of the polymer, than to use the compound,

simultaneously with the dichlorobenzene. Aromatic compounds, suitable for use in the present invention include, for example, structures such as the following:

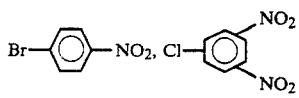

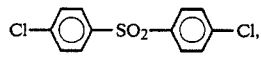

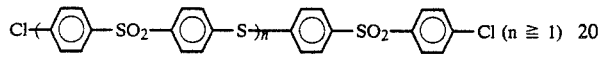

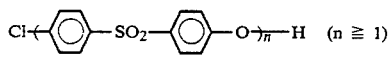

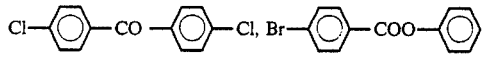

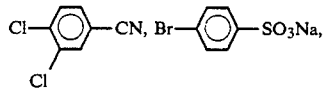

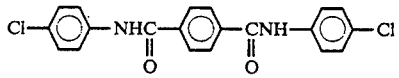

Where the polymerization of the polyphenylene sulfide is effected by reacting dichlorobenzene and sodium sulfide, with N-methyl-pyrrolidone as the solvent, the molar ratio of the monomers may be in the range of 0.90–1.20, and the reaction may be carried out under pressurized conditions at 250°–280° C. after dehydration of the system. The

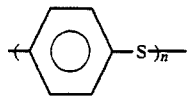

chain length in the polymer during the reaction or after reaction may be determined by measurement of the molecular weight of the isolated polymer. The aromatic halogen compound containing the electron attractive group may be subjected to the reaction during stirring, in the course of polymerization, after completion of polymerization, or after isolation of the polymer, but reaction within several hours in the temperature range of about 150° to 280° C. is preferable. In the above-described reaction, the optimum amount of aromatic halogen compound containing the electron attractive group to be added is in the range of about 0.05–20 mole % per polyphenylene sulfide constituting unit. If the amount added is in excess of this range, recovery is undesirably effected in the unreacted state. To recover the polymer after reaction, conventional procedures may be used such as discharging the system into water with subsequent filtration and washing with water or removal of solvent through flushing followed by water washing, etc.

The polymerization and reaction as described above, may be effected in the presence of an alkaline metal salt of carboxylic acid and hydroxy alkaline as polymerization modifiers, as disclosed for example, in Japanese Patent Publication No. 52-12240.

To achieve further reaction of the polymer after isolation, it is possible to subject the polymer to the reaction in a polar solvent such as N-methylpyrrolidone, etc., or, in appropriate cases, in the presence of a polymerization modifier or hydroxy alkali conventionally employed during polymerization.

Although the present invention may be achieved by the representative methods described above, a similar effect can be achieved to a certain extent by mixing a separately synthesized

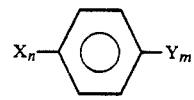

reaction polyphenylene sulfide and unmodified polyphenylene sulfide. Where this alternative method is used, the content of the constituent contained in the mixed polymer is preferably in the range of about 0.05 to 10 mole %.

The mechanisms by which the stabilization of the polyphenylene sulfide of the present invention occurs seems to be related to the radical mechanisms, although this has not been proven. However, one of the effects of the present invention is the increased stability, or reduced degree of crosslinking, upon heating of the polymer in air. More specifically, the oxidizing crosslinking characteristics inherent in polyphenylene sulfide are suppressed, and through the present invention it is possible to collect and reuse molded items, and the long term heat stability of products produced from a polymer of the present invention are also improved. When molded articles produced from conventional, unmodified polyphenylene sulfide are allowed to stand in air at high temperatures, the articles become brittle, with a reduction in elongation, due to the crosslinking characteristics which are inherent in the polymer. Such undesirable properties are not present in products molded from the polymer of the present invention. Furthermore, through use of the polymer of the present invention, weatherability or durability against ultraviolet radiation is improved which provides prolongation of the life of molded articles produced for outdoor use.

Moreover, through the use of the polymer of the present invention, viscosity reduction, which occurs during the molten state, i.e. the cleavage of the polymer chain, is suppressed, the production of volatile low molecular weight compounds, including inorganic gases containing sulphur, is reduced, while gel fraction in the molded articles may also be reduced.

As may be seen from the foregoing description, since the polymer of the present invention is stabilized against such forms of energy as heat, ultraviolet radiation, oxidation, etc., there is presented a polymer suitable for end uses in which heat resistance, light resistance, viscosity stability, gas emission reduction, etc. are required. Such end uses include films, yarns, injection molded items and the like. The polymer of the present invention may be used to produce such improved end use items without impairing the superior mechanical, thermal, chemical and electrical characteristics inherent in polyphenylene sulfide. In addition, the properties of the polymer of the present invention are not hindered, even where an inorganic filler is mixed with other polymers.

The following examples are presented for the purpose of illustrating the preferred embodiments of the present invention and are not intended to limit the scope of the invention.

EXAMPLE 1

400 ml of N-methylpyrrolidone, 1 mole of $Na_2S \cdot 9H_2O$, 0.8 mole of sodium benzoate, and 0.3 mole of NaOH were placed in a 1 l autoclave and dehydration was effected using a nitrogen stream under agitation until the internal temperature reached 200° C. After completion of the dehydration, the internal temperature was lowered to 170° C. 1.01 moles of p-dichlorobenzene was added and pressurization to 4 kg/cm² was effected with the use of nitrogen. After raising the internal temperature to 270° C., polymerization was carried out with agitation for two hours. Thereafter the system was cooled, the contents were emptied into water, then poured through a 300 mesh wire net to collect the flake-like polymer. By repeated rising in dilute aqueous hydrochloric acid and washing with acetone, approximately 70 g of white polymer was obtained. The degree of polymerization of the resultant polymer was determined to be approximately 250 as measured by the light scattering method in chloronaphthalene at 210° C. 20 g of the polymer thus obtained, 1.5 g of NaOH, 5 g of sodium benzoate, 5 g of a reacting reagent as listed in Table 1 and 200 ml of NMP were heated and stirred at 200° C. in a nitrogen stream for two hours. After the reaction was carried out, the polymer was washed with water then washed with acetone, and the nonreacted reagents in the acetone washing solution were determined by gas chromatography for reverse calculation of the reagent constituent remaining in the polymer. To determine the stability of the polymer with respect to oxidizing crosslinking, the viscosity was determined before and after allowing the polymer to stand for two hours in air at 250° C. (The apparent density of the polymer was 0.36 g/cc in each case, with almost no variation). The viscosity measurement was made using a Kokashiki flow tester at a temperature of 300° C. and a shear rate of 200 sec.$^{-1}$.

Although the viscosity after the reagent reaction differed depending on the reacting agents, it has been confirmed, from the viscosity measurements after heating in air, that the polyphenylene sulfide according to the present invention has greatly increased stability as shown in Table 1.

TABLE 1

| Reacting reagent | Reaction rate (mole %) | Viscosity (poise) Before heating at 250° C. | Viscosity (poise) After heating at 250° C. |
|---|---|---|---|
| Present invention | | | |
| Cl—⟨○⟩—SO₂—⟨○⟩—Cl | 1.0 | 2800 | 4110 (1.5 times) |
| Cl—⟨○⟩—CO—⟨○⟩—Cl | 0.8 | 2480 | 5500 (2.2 times) |
| Br—⟨○⟩—NO₂ | 0.6 | 2550 | 6150 (2.4 times) |
| Other than present invention | | | |
| Cl—(⟨○⟩—SO₂—⟨○⟩—O)ₙCl* | 1.8 | 2680 | 5370 (2.0 times) |
| Br | 0.7 | 1200 | 15800 (13.2 times) |
| None | — | 1160 | 13500 (11.6 times) |

*Unprocessed polyphenylene sulfide was added

For comparison,

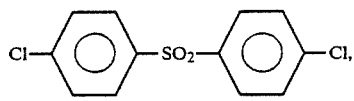

equivalent to 5 mole %, was blended with untreated polyphenylene sulfide and the viscosity was measured before and after heating at 250° C. The results indicate that there was little difference when compared with polymers other than those of the present invention without reacting agents, although a rapid increase in viscosity was observed.

EXAMPLE 2

Polymerization of poly-p-phenylene sulfide was carried out in a manner similar to that used in Example 1 except that 60 mole % sodium benzoate was used and the reaction time was increased to 3 hours at 270° C. Immediately after polymerization, the system was cooled to 250° C. and 21.5 g of N-methyl-pyrrolidone solution of diphenyl dichlorosulfone was added by means of a high pressure dropping system. The system was heated for one hour and the polymer was recovered in a manner similar to that employed in Example 1. The degree of polymerization, determined as in Example 1, was found to be 220. The viscosity of this polymer, which had an apparent density of 0.34 g/cc, was determined to be 1,120 poise. After heating the polymer in air at 250° C. for two hours the viscosity increased to only 1,800 poise. Thus, an excessively large viscosity rise was not observed.

In Table 2, the viscosity variation of the polymer of Example 2 with time in the molten state in a vacuum at 300° C. is given in comparison with that of the untreated polymer obtained in Example 1.

TABLE 2

| Heating Time | Viscosity (poise) | |
| at 300° C. | Example 2 | Example 1 |
| --- | --- | --- |
| 0 | 1120 | 1160 |
| 4.0 | 1280 | 709 |
| 15.0 | 1239 | 419 |
| 24.0 | 550 | 387 |

The results shown in Table 2 indicate that the polymer of the present invention is stabilized against polymer chain breakage.

By quenching the polymer thus obtained, after press molding at 300° C., a transparent amorphous film of about 200μ was obtained. The film was subjected to simultaneous biaxial stretching of 3.5×3.5 times using a film stretcher manufactured by T. M. Long Co., and then, was thermally fixed for 60 seconds at 250° C. at a fixed length and a film of 15μ was obtained. Upon examination for gel, as determined by placing the film between polarized films, it was found that the film was uniformly transparent, with almost no gel.

From the untreated polymer of Example 1, a film was produced using the method described above. In this untreated polymer film, several gels per 10 cm² were observed with visual examination. A comparison of the reduction in strength and elongation of the film produced from the polymer of Example 2 and the untreated polymer film produced from the untreated polymer of Example 1, after allowing the films to stand outdoors for ten days are shown in Table 3.

TABLE 3

| | Film of the present invention (Example 2) | | Untreated film (Example 1) | |
| --- | --- | --- | --- | --- |
| | Strength (kg/mm²) | Elongation (%) | Strength (kg/mm²) | Elongation (%) |
| Initial value | 15.6 | 73 | 15.5 | 75 |
| After leaving outdoors for 10 days | 14.0 | 65 | 7.0 | 21 |

As is clearly demonstrated in Table 3, the film employing the polymer of the present invention is remarkably superior in weatherability to film produced using conventional, untreated polyphenylene sulfide polymers.

EXAMPLE 3

Example 2 was repeated substituting 60 mole % of lithium acetate for the sodium benzoate. The polymer, treated with dichlorodiphenyl sulfone as in Example 2, was washed with water and dried. The polymer thus produced had a viscosity of 3400 poise. An amorphous 500μ thick film was made using a melt press at a temperature of 320° C. and a shear rate of 200 sec.$^{-1}$, followed by water quenching using a water bath at about 10° C. The degree of polymerization was greater than 250 as measured before the addition of the dichlorodiphenyl sulfone. This transparent amorphous film was simultaneously biaxially stretched 3.5×3.5 times at 95° C., using a T. M. Long film stretcher, to obtain a 37μ thick biaxially oriented film. The stretched film was heat-set at a constant length at 250° C. for 60 seconds. (Film A of this invention).

To compare the thermal endurance of the treated polymer film and a non-treated polymer film, a portion of the polymerization solution, obtained before addition of the dichlorodiphenyl sulfone, was separated, washed and dried. This non-treated polymer had a viscosity of 2200 poise at a temperature of 320° C. and a shear rate of 200 sec.$^{-1}$. The above non-treated polymer was formed into a biaxially oriented heat set film having 35μ thickness in the same manner as the treated polymer. (Film B as reference film). The thermal endurance of each film was measured and the results are summarized in Table 4.

TABLE 4

| | Film A | | Film B | |
| Aging time at 220° C. | Strength (kg/mm²) | Elongation (%) | Strength (kg/mm²) | Elongation (%) |
| --- | --- | --- | --- | --- |
| 0 hours | 19.0 | 56.0 | 18.5 | 61.0 |
| 72 hours | 20.5 | 68.5 | 17.0 | 52.0 |
| 220 hours | 17.5 | 48.5 | 10.5 | 30.0 |
| 560 hours | 16.0 | 42.0 | 8.5 | 27.5 |
| 975 hours | 15.5 | 40.0 | 8.0 | 25.5 |
| 1500 hours | 11.5 | 35.0 | 5.5 | 18.0 |
| 1800 hours | 10.5 | 33.0 | 5.0 | 16.0 |

EXAMPLE 4

95 wt. % of the polymer of Example 1 prepared using 4,4'-diphenyl-dichlorosulfone,

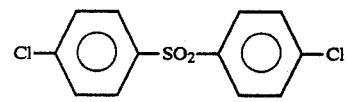

as the reacting agent, and 5 wt. % of the polymer of Example 1 prepared using 4,4'-diphenyl-dichlorosulfone which had been heated in air at 250° C. for 2 hours were mixed in the powdered state.

In a similar manner, 95 wt. % of the untreated polymer of Example 1 and 5 wt. % of the untreated polymer which had been heated in air at 250° C. for 2 hours were mixed.

Each mixture was melt-pressed at 300° C. and quenched in water at 10° C. to obtain 200μ transparent films. Each of the films was subjected to simultaneous biaxial stretching of 3.0×3.0 times, using a film stretcher manufactured by T. M. Long Co., at 93°–97° C.

The gel content of each film was observed under polarized light. Few gels were observed in the film prepared from the treated polymer, but a large number of gels were observed in the film prepared from the untreated polymer.

Both films produced transparent films after heat setting at 270° C. for 30 seconds under restraint.

What is claimed is:

1. A stabilized crystalline polyphenylene sulfide having a reduced degree of oxidizing cross-linking characteristics, and having a crystalline melting point in the range of about 250° C. to about 350° C. which comprises at least 90 mole % of a recurring unit,

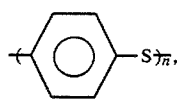

wherein n is greater than 20, and about 0.05 to about 10 mole % per phenylene sulfide unit of an aromatic constituent chemically bonded with said polyphenylene sulfide chain, said aromatic constituent containing an electron attractive group selected from the group consisting of —SO$_2$—, —CO—, —NO$_2$, —SO$_3$R, and —COOR, wherein R is H, lower aliphatic hydrocarbon groups, aromatic hydrocarbon groups, alkaline metals, or —CONH—.

2. The stabilized polyphenylene sulfide of claim 1 wherein the electron attractive group is selected from the group consisting of —SO$_2$— and —CO—.

3. The stabilized polyphenylene sulfide of claim 1 wherein the viscosity is at least 100 poise at a temperature of 300° C. and a shear rate of 200 sec.$^{-1}$.

4. A film formed of the stabilized polyphenylene sulfide of claim 1.

5. An injection molded product formed of the stabilized polyphenylene sulfide of claim 1.

6. A fiber formed of the stabilized polyphenylene sulfide of claim 1.

7. A powder for electronic parts encapsulation of the stabilized polyphenylene sulfide of claim 1.

8. A method of preparing a stabilized crystalline polyphenylene sulfide having a reduced degree of oxidizing crosslinking characteristics and having a crystalline melting point in the range of about 250° C. to about 350° C., which comprises preparing a polyphenylene sulfide consisting of at least 90 mole % of a recurring unit,

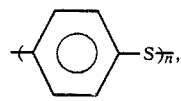

wherein n is greater than about 20, and reacting said polyphenylene sulfide at 150° to 280° C. with 0.05 to 20 mole % per said phenylene sulfide unit of a halogenated aromatic constituent chemically bonded with said polyphenylene sulfide chain, the aromatic constituent containing an electron attractive group selected from the group consisting of —SO$_2$—, —CO—, —NO$_2$, —SO$_3$R, and —COOR, wherein R is H, lower aliphatic hydrocarbon groups, aromatic hydrocarbon groups, alkaline metals or —CONH—.

9. The method of claim 8 wherein said halogenated aromatic compound having an electron attractive group is

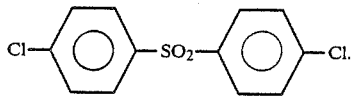

* * * * *

UNITED STATES PATENT AND TRADEMARK OFFICE
CERTIFICATE OF CORRECTION

PATENT NO. : 4,486,578
DATED : December 4, 1984
INVENTOR(S) : Toshiyuki Asakura, Hiroaki Kobayashi, Yukio Noguchi It is certified that error appears in the above-identified patent and that said Letters Patent is hereby corrected as shown below:

Example 1, last line reading "*Unprocessed polyphenylene sulfide was added" please insert --to a system in which 4 g of $C-\text{\textlangle O\textrangle}-SO_2-\text{\textlangle O\textrangle}-C\ell$ and 2.5 g of $KO-\text{\textlangle O\textrangle}-SO_2-\text{\textlangle O\textrangle}-OK$ were preliminarily subjected to reaction in N-methylpyrrolidone at 200°C for 2 hours. The reaction rate was obtained by reverse calculation (n $\doteqdot$ 4 ~ 5) from the weight of the polyether sulfone in the acetone rinsing solution.--

Signed and Sealed this

Fifteenth Day of October 1985

[SEAL]

Attest:

Attesting Officer

DONALD J. QUIGG

Commissioner of Patents and Trademarks—Designate